United States Patent [19]

Wakeland

[11] Patent Number: 5,254,984
[45] Date of Patent: Oct. 19, 1993

[54] VGA CONTROLLER FOR DISPLAYING IMAGES HAVING SELECTIVE COMPONENTS FROM MULTIPLE IMAGE PLANES

[75] Inventor: Carl K. Wakeland, Bedford, Tex.

[73] Assignee: Tandy Corporation, Fort Worth, Tex.

[21] Appl. No.: 817,028

[22] Filed: Jan. 3, 1992

[51] Int. Cl.⁵ .......................... G09G 5/40; G06F 3/14
[52] U.S. Cl. ..................................... 345/144; 345/189
[58] Field of Search ........................ 340/747, 799, 721; 358/22

[56] References Cited

U.S. PATENT DOCUMENTS

| | | | |
|---|---|---|---|
| 4,243,984 | 1/1981 | Ackley et al. | 340/747 X |
| 4,471,465 | 9/1984 | Mayer et al. | 340/701 X |
| 4,498,079 | 2/1985 | Ghosh et al. | 340/725 |
| 4,509,043 | 4/1985 | Mossaides | 340/747 X |
| 4,599,610 | 7/1986 | Lacy | 340/721 |
| 4,616,336 | 10/1986 | Robertson et al. | 340/721 X |
| 4,635,049 | 1/1987 | Dodge et al. | 340/747 X |
| 4,686,521 | 8/1987 | Beaver et al. | 340/747 X |
| 4,818,979 | 4/1989 | Manson | 340/747 X |
| 4,876,651 | 10/1989 | Dawson et al. | 340/995 |
| 4,878,183 | 10/1989 | Ewart | 340/799 X |
| 4,958,146 | 9/1990 | Priem et al. | 340/799 X |

*Primary Examiner*—Alvin E. Oberley
*Assistant Examiner*—Kara Farnandez
*Attorney, Agent, or Firm*—David L. McCombs; Michael S. Bush

[57] ABSTRACT

A VGA controller having an overlay mode for displaying images formed from selective components of multiple image planes. A first image and a second image overlaying the first image are interleaved into three of four bit planes of a dynamic random access memory. When displaying the image, the controller will simultaneously read from the first and second images. If the value of the second image is non-zero, then the second image is displayed. Otherwise, the first image is displayed.

16 Claims, 5 Drawing Sheets

VGA CONTROLLER FOR DISPLAYING IMAGES HAVING SELECTIVE COMPONENTS FROM MULTIPLE IMAGE PLANES

CROSS REFERENCE TO RELATED APPLICATIONS

This application is related to co-pending U.S. patent application Ser. No. 07/770,544, entitled METHOD AND APPARATUS FOR ENCODING VIDEO COLOR DATA SIGNALS AND PROTOCOL FOR ENCODING SAME, now U.S. Pat. No. 5,185,655, and No. 07/771,310 entitled VIDEO COLOR DECODER FOR USE IN MULTIMEDIA SYSTEMS, now U.S. Pat. No. 5,220,410, both of which were filed on Oct. 2, 1991, assigned to the assignee of the present application and hereby incorporated by reference as if reproduced in their entirety.

This application is also related to co-pending U.S. patent application Ser. No. 07/745,014, entitled METHOD AND APPARATUS FOR MERGING VIDEO DATA SIGNALS FROM MULTIPLE SOURCES AND MULTIMEDIA SYSTEM INCORPORATING SAME, filed on Jan. 2, 1992, assigned to the assignee of the present application and hereby incorporated by reference as if reproduced in its entirety.

BACKGROUND OF THE INVENTION

1. Field of the Invention

The present invention relates to a video graphics array (or "VGA") controller for a multimedia system and, more particularly, to a VGA controller having an overlay mode for displaying images formed from selective components of multiple image planes.

2. Description of Related Art

Various techniques for displaying at least two different displays of information on a video display have been disclosed in the art. Such techniques have been most commonly disclosed in connection with the development of techniques for overlaying information on a video display. For example, U.S. Pat. No. 4,200,869 to Murayama et al. discloses a system where an alphanumeric character may be superimposed over a graphical character in a manner such that the alphanumeric character may be read but the graphical character, and thus the continuity of the graphical display, is not destroyed. In Murayama et al., the output from first and second display generators are provided to an OR gate, the output of which drives a CRT. Selective prioritizing of the generated display signals is not possible in the Murayama et al. system.

Another video display system having a signal overlay capability is disclosed in U.S. Pat. No. 4,599,610 to Lacy. In Lacy, an overlay video signal, most commonly, an alphanumeric display, is given priority over a normal video signal, most commonly, a graphical display. The normal video signal is supplied to the base of a first emitter follower transistor while the overlay video signal is supplied to the base of a second emitter follower transistor. The two transistors are biased such that the first (normal) transistor is at a slightly lower voltage than the second (overlay) transistor and is reversed biased (off) any time data is available from the overlay video signal, thereby prioritizing the display of the overlay video signal, when available, over the normal video signal.

SUMMARY OF THE INVENTION

A multimedia system having a VGA controller having an overlay mode for displaying images formed from selective components of multiple image planes. Through use of the 32-bit virtual data bus in the VGA architecture, a 256 color background bit-mapped image having 8 data bits per pixel element and a 16 color foreground bit-mapped image having 4 data bits per pixel element are stored on three of four bit planes of a dynamic random access memory, with the background pixel data stored on the two lowest order planes and the foreground pixel data stored on the next plane. The highest order plane is not used. When displaying the image, the controller will simultaneously read from the foreground and the background images for each pixel. If the value of the foreground pixel element is non-zero, then the foreground pixel element is sent to a palette for display. If the value of the foreground pixel element is zero, then the corresponding background pixel element is sent to the palette instead.

BRIEF DESCRIPTION OF THE DRAWINGS

The invention may be better understood and its numerous objects, features and advantages become apparent to those skilled in the art by referencing the accompanying drawings in which.

DETAILED DESCRIPTION OF A PREFERRED EMBODIMENT

Figure 1:
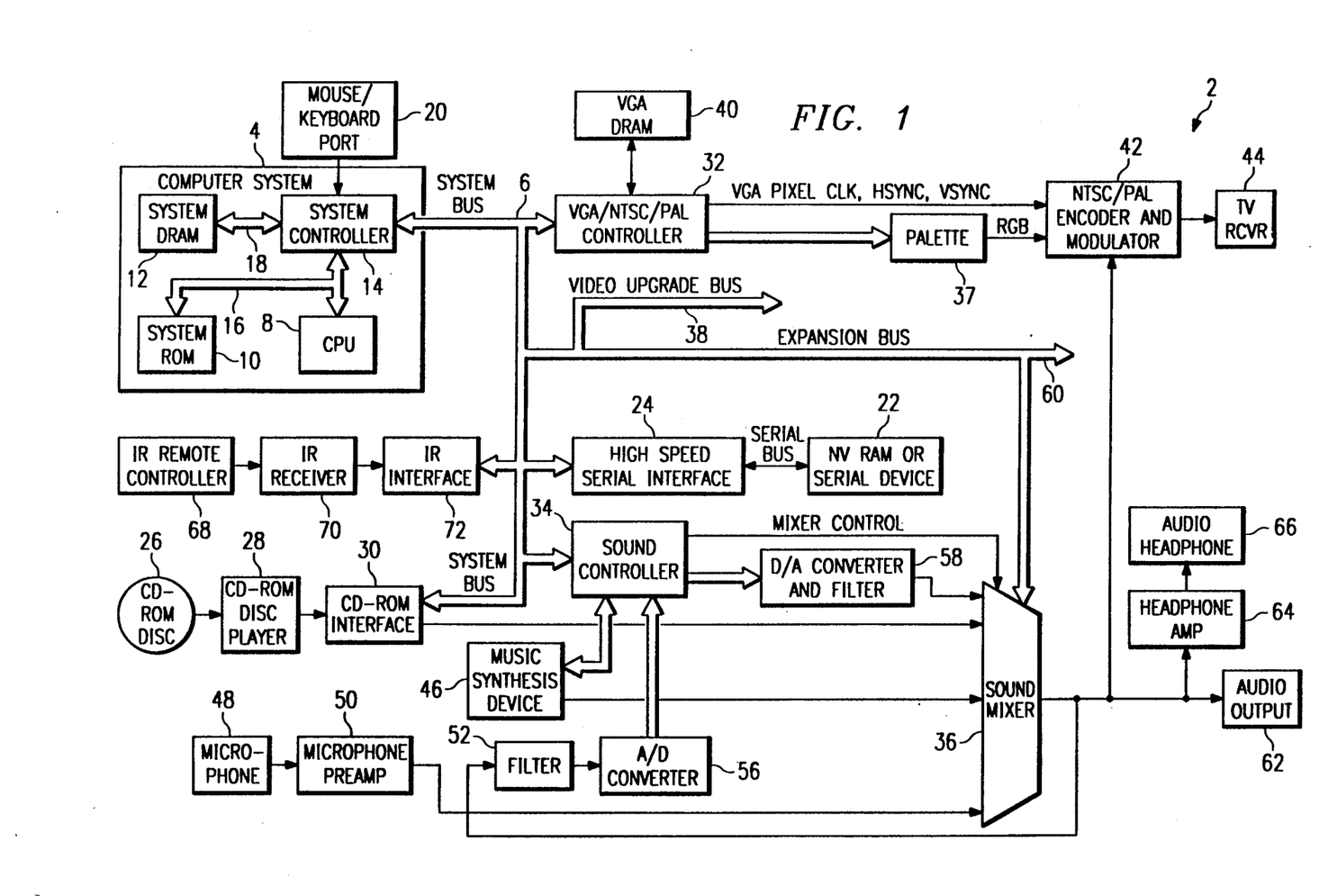
FIG. 1 is a block diagram of a multimedia system having a VGA controller operable in an overlay mode wherein images formed from selective components of multiple image planes are displayed.

Referring first to FIG. a multimedia system having a VGA controller having an overlay mode for displaying images formed from selective components of multiple image planes in a single display shall now be described in greater detail. The multimedia system 2 is configured to receive audio and/or video signals from multiple sources and transmit the received signals to selected audio and/or video reproduction equipment associated with the multimedia system 2. The overall operation of the multimedia system 2 is controlled by a general purpose computer system 4 such as a desktop computer operably connected with the remainder of the multimedia system 2 by a system bus 6. In addition to managing the flow of data and control signals between the various components of the multimedia system 2, it is contemplated that the computer system 4 shall be capable of running software applications and, if desired, utilizing the video and/or sound components of the multimedia system 2 for display and/or audio generation purposes.

The computer system 4 includes a central processing unit (or "CPU") 8 such as an 80286 microprocessor, a system read only memory (or "ROM") unit 10, a system dynamic random access memory (or "DRAM") unit 12 and a system controller 14. The CPU 8, the system ROM 10 and the system controller 14 are interconnected by address, data and control bus 16 for the transfer of address, data and control signals therebetween. Similarly, an address, data and control bus 18 interconnects the system DRAM unit 12 and the system controller 14 for the transfer of address, data and control signals therebetween. A mouse/keyboard port 20 is operatively connected to the system controller 14 for operator input of data or control signals via a mouse, computer keyboard or other input device. Finally, additional data transfer and/or data storage capability is provided by a serial device 22 operatively connected to the system bus 6 via a high speed serial interface 24. For example, in the embodiment of the invention illustrated herein, the serial device 22 is a non-volatile (or "NV") RAM which provides powered down storage capacity for the computer system 4. Alternately, the serial device 22 may be a printer, modem or other serial device commonly used in two way data transfers.

Data may be input the multimedia system 2 using a compact disc read only memory (or "CD-ROM") 26 having video, audio, text, computer software, and/or other data stored thereon. For example, co-pending U.S. patent application Ser. No. 07/770,554 entitled METHOD AND APPARATUS FOR ENCODING VIDEO COLOR DATA SIGNALS AND PROTOCOL FOR ENCODING SAME, now U.S. Pat. No. 5,185,655 and previously incorporated by reference, discloses full color video data signals digitally encoded in a format suitable for storage on a CD-ROM. The CD-ROM 26 is inserted in a CD-ROM disc player 28 which reads the digitally encoded data stored on the CD-ROM 26 and transmits the data to a CD-ROM interface 30. The CD-ROM interface 30 identifies the type of data read from the CD-ROM 26 and transmits the data to an appropriate multimedia system component via the system bus 6. For example, video signals would most commonly be transmitted to a VGA/NTSC/PAL controller 32 (hereafter referred to as "VGA controller 32"), audio signals to a sound controller 34 and computer programs to the computer system 4, although, it is contemplated that, in certain applications, digitally encoded data would be transferred to the computer system 4 for processing and/or storage purposes before reaching its final destination. Also, certain audio signals identified by the CD-ROM interface 30 may be what is commonly referred to as "red book" audio signals and which are directly transferred to a sound mixer 36 via an audio connection between the CD-ROM interface 30 and the sound mixer 36.

Encoded video signals propagated to the VGA controller 32 are transferred to a memory subsystem, for example, a 256Kbyte DRAM 40, associated with the VGA controller 32 for storage prior to display. The VGA DRAM 40 is organized into four bit planes, each up to 64 Kbytes long and accessible at the same host addresses. The address which refers to one byte in the system DRAM 12 of the CPU 4 refers to four bytes of memory in the VGA DRAM 40. Thus, each of these four bytes, one of which is associated with each of the four bit planes, resides at the same host address. Accordingly, from the perspective of the CPU 4, the VGA DRAM 40 may be viewed as a 32-bit wide memory having a 32-bit virtual data bus. As will be more fully described below, the VGA controller 32 disclosed herein, by use of the aforementioned 32-bit virtual data bus, is configured to interleave two independent images, a 256 color background and a 16 color foreground, seen by the CPU 4 as two discrete maps, or data sets, into the VGA DRAM 40 utilizing three of the four bit planes provided therein.

When displaying the mapped images stored in VGA DRAM 40, the VGA controller 32 simultaneously reads corresponding pixel elements of the foreground and background images and, based upon the value of the foreground image, will select either the foreground or background image for transmission to the palette 37. The palette 37 decodes the encoded digital video signals, converts the signals into red, green and blue (or "RGB") components, and then converts the RGB video signals into analog form. It is contemplated that the VGA controller 32 will be configured to drive the operation of the palette 37 in various modes, thereby enabling the multimedia system 2 to display high color content natural images, animation images as well as combinations of the two. It is further contemplated that the palette 37 will be configured to perform multiple modes of decoding, including compressed YUV and border encoding, thereby permitting the multimedia system 2 to produce an enhanced display of various types of video data, including full motion, animated and still images. A video upgrade bus 38 is provided so that auxiliary boards capable of driving the operation of the palette 10 in still other imaging modes may also be installed as part of the multimedia system 2.

The analog RGB video signals are then transmitted to a NTSC/PAL encoder and modulator 42 which, under the control of the VGA pixel clock (or "CLK") signal and horizontal and vertical synchronizing (or "HSYNC and VSYNC") signals from the VGA controller 32, modulates the received RGB video signals into a form suitable for display by the video display component of television (or "TV") receiver 44. Audio signals are transmitted to the audio generation component of the television receiver 44 by a sound mixer 36 which transmits audio signals to the NTSC/PAL encoder and modulator 42 which synchronizes the audio and video signals before transmission to the television receiver 44.

As previously discussed, the multimedia system 2 includes a sound controller 34 which, in conjunction with the system controller 14, controls the transmission of audio signals between various sources and destinations. In addition to those audio signal sources and destinations previously discussed, digital audio signals may also be generated by a music synthesis device 46 and transmitted directly to the sound controller 34 or by the computer system 4 and transmitted to the sound controller 34 via the system bus 6. Analog input audio signals such as live sounds may be detected by a microphone 48, transmitted to a microphone pre-amp 50 which amplifies the input audio signal. The output of the microphone pre-amp 50 is transmitted directly to the sound mixer 36 for mixing with signals from other sound sources such as the music synthesis device 46, the CD-ROM disk 26 or others. The mixed sound signal is then filtered by an anti-aliasing filter 52, digitized by an analog to digital converter 54 and transmitted to the sound controller 34. The sound controller 34 transmits the digital audio signals received from the various sources to a digital to audio converter 58 for conversion to analog and, in turn, to the sound mixer 36.

In addition to the multiple source originating, analog audio signals received from the digital to analog converter 58, the sound mixer 36 is connected to receive audio signals from the CD-ROM interface 30, the music synthesis device 46, the microphone pre-amp 50 and, if direct audio capability is installed on the expansion 60 to the system bus 6, from the expansion bus 60 as well. Under control signals generated by the sound controller 34, the sound mixer 36 will select the audio signal to be output and propagate the selected signal to an audio output 62 which may be, for example, a speaker system, or, via a headphone amp 64, to an audio headphone 66.

Operator control of the various components of the multimedia system 2 from a remote location is provided by a hand-held infra-red remote controller 68. Upon operator actuation, the infra-red remote controller 68 transmits a control signal capable of detection by a IR receiver 70 which also transmits the detected control signal to the system bus 6 via an IR interface 72.

In accordance with the teachings of the present invention, the VGA controller 32 disclosed herein is configured to provide for the rapid display of an independent foreground image comprised of a cursor, sprite, text window or other simple graphics overlaid onto a more detailed independent background image by switching, pixel-by-pixel, between the foreground and background images, respectively mapped in two separate memory planes (i.e. a background image memory plane addressed at AXXXX and a foreground image memory plane addressed at BXXXX). Before addressing the specific configuration of the subject VGA controller 32, it will be useful to discuss the format of the foreground and background images.

The overlay mode disclosed herein supports a 256 palettized color background bit-mapped image and a 16 color foreground bit-mapped image which includes 15 palettized colors and a sixteenth color (transparent) which actuates a switch between the foreground and background images. More specifically, as illustrated in Table I below, each pixel element (or "PEL") of the foreground image is encoded in four bits, packed two PELS per byte, and each background PEL is encoded in eight bits, packed one PEL per byte.

TABLE I

| FOREGROUND PEL | | | | | | | |
|---|---|---|---|---|---|---|---|
| 7 | 6 | 5 | 4 | 3 | 2 | 1 | 0 |
| First 4-bit Display PEL | | | | Second 4-bit Display PEL | | | |
| BACKGROUND PEL | | | | | | | |
| 7 | 6 | 5 | 4 | 3 | 2 | 1 | 0 |
| 8-bit Display PEL | | | | | | | |

Each 4-bit foreground PEL maps to a corresponding 8-bit background PEL and the images are bit-mapped in the system DRAM 12 illustrated Table 2 below.

TABLE II

| CPU Address | Display Buffer |
|---|---|
| A0000 - AF9FF | Background |
| AFA00 - AFFFF | Reserved |
| B0000 - B7CFF | Foreground |
| B7D00 - BFFFF | Reserved |

The CPU addresses are linearly mapped. For example, background PEL#1 is located at CPU address A0000, background PEL#2 is located at CPU address A0001, etc.

The overlay mode steered data is interleaved (i.e., background PEL data, foreground PEL data, background PEL data, foreground PEL data, etc.) in the VGA DRAM 40 in the following configuration:

TABLE III

| VGA DRAM ADDRESS | D0-7 | D8-15 | D16-23 | D24-31 |
|---|---|---|---|---|
| 0000 | A0000 | A0001 | B0000 | NOT USED |
| 0004 | A0002 | A0003 | B0001 | NOT USED |
| 0008 | A0004 | A0005 | B0002 | NOT USED |
| . | . | . | . | . |
| . | . | . | . | . |
| 1F3FC | AF9FE | AF9FF | B7CFF | NOT USED |

It should be understood that the entries in Table III (i.e., A0000, A0001, etc.) are CPU addresses which represent data stored at those addresses in the system DRAM 12. As previously described, a CPU address which refers to one byte in the system DRAM 12 refers to four bytes in the VGA DRAM 40. The VGA DRAM addresses are linearly mapped and, as may be seen in Table III, the use of the 32-bit "virtual" data bus architecture in the VGA DRAM 40 provides two discrete maps, or sets of data, (as seen by the CPU 4) comprising the foreground image signal and the background image signal, respectively, stored at CPU addresses BXXXX and AXXXX. The two sets of data are stored in the VGA DRAM 40, with the background PEL data steered to the first and second bit planes (D(0-15)), and the foreground data steered to the third bit plane (D(16-23)). The fourth bit plane (D(24-31)) is not used. It is contemplated, however, that this byte could be used as an alternate page for an additional foreground image which could be enabled by an additional control bit in the architecture. Each 32-bit word fetched by the controller 82 from the VGA DRAM 40 while in the overlay mode will contain two PELs from the foreground data set (BXXXX) on bits D(16-23) and two PELs from the background set (AXXXX) on its D(0-15).

Figure 2:
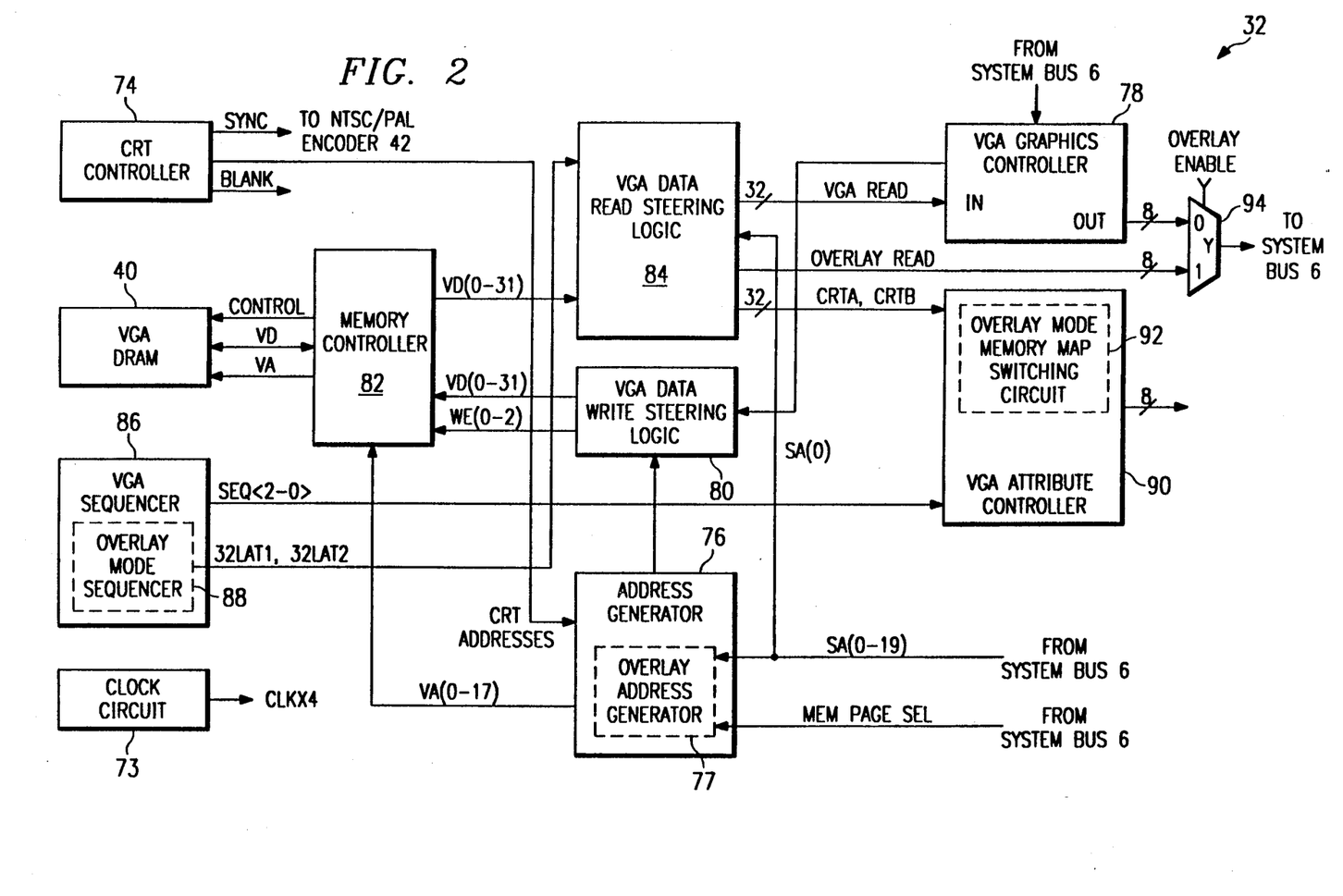
FIG. 2 is a block diagram of the VGA controller of FIG. 1.

Referring next to FIG. 2, the VGA controller 32 configured to implement the overlay mode herein disclosed will now be described in greater detail. As is conventional in the art, the VGA controller 32 includes a CRT controller 74, an address generator 76, a VGA graphics controller 78, a memory controller 82, a VGA sequencer 86 and a VGA attribute controller 90. As will be more fully described below, however, certain of these elements have been supplemented with additional hardware so that the VGA controller 32 may implement the overlay mode of operation.

The CRT controller 74 generates synchronization (or "SYNC") signals HSYNC and VSYNC to the NTSC/PAL encoder and modulator 42 to control the scan rate of the display and blanking signals, both horizontal and vertical, to the palette 37 to control the refresh rate of the display. The CRT controller 74 also provides addresses for reading data bits from the VGA DRAM 40 for display. Provided within the address generator 76 is an overlay mode address generator 77 which receives system addresses SA(0)-SA(19), via the system bus 6, from within the memory map of the CPU 4 which corresponds to the locations within the CPU's view of the video memory of the data signals being transferred and generates address decode signals which control the writing of overlay mode video data signals to the VGA DRAM 40 by steering the overlay mode signals within the VGA data steering logic 80.

Background and foreground image signals, typically generated by the CPU 4, are transmitted to a VGA graphics controller 78 of the VGA controller 32. The VGA graphics controller 78 maps the input data bits to a display plane within the VGA DRAM 40 by transmitting the input data bits to the VGA data write steering logic 80 which, under the control of the overlay mode address generator 77, steers the input data bits to a location within the VGA DRAM 40. The steered video data VD(0-31) and the corresponding video addresses VA(0-17) are propagated by the VGA data write steering logic 80 and the address generator 76, respectively, to the memory controller 82 which writes the data bits VD(0-31) to the addresses VA(0-17) within the VGA DRAM 40.

During a read operation from the VGA DRAM 40, the memory controller 82 directs the data bits VD0-31 to the VGA data read steering logic 84. Depending on the type of read operation being conducted, the VGA data read steering logic 84 will selectively direct the data received from the memory controller 82 to the appropriate destination. In the event that the read operation being conducted is a system bus read, the data transmitted to the VGA data read steering logic 84 will be output to the system bus along a path which varies based upon whether the video is configured in VGA mode or overlay mode. In VGA mode, data being transmitted to the CPU 4 during a system bus 6 read is directed to the VGA graphics controller 78 and on to a multiplexer 94. In overlay mode, data being transmitted to the CPU 4 is directly transmitted to the multiplexer 94 where the overlay enable signal generated by the CPU 4 will propagate the background or foreground data to the CPU 4. More specifically, if SA(19-0) equals A0000-AFFFF, background data is read and, if SA(19-0) equals B0000-BFFFF, foreground data is read.

In the event, however, that a CRT read is being conducted, the data transmitted to the VGA data Read Steering logic 84 will be transmitted to the VGA attribute controller 90 for output to the TV receiver 44 for display. The foreground and background data bits are interleaved, and the data is transmitted to an overlay mode memory map switching circuit 92 where, under the control of SEQ <2-0> signals generated by the VGA sequencer 86, either the foreground or background data is selected for transmission. Again, the foreground data is selected if it is any one of the fifteen palettized colors and the background data is selected if the foreground data bit is the transparent value. The data selected by the overlay mode memory map switching circuit is then output to the palette 37 for decoding and transmission to the TV receiver 44 for display.

Figure 3:
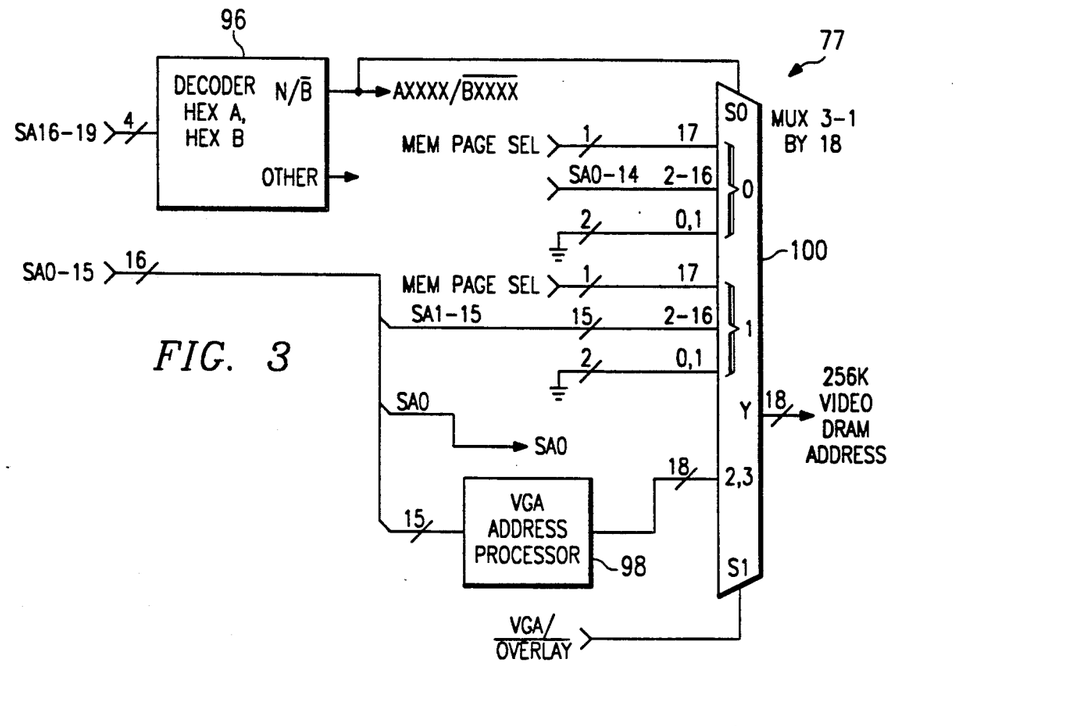
FIG. 3 is a block diagram of the address generator of FIG. 2.

Referring next to FIG. 3, the overlay address generator 77 shall now be described in greater detail. When the CPU 4 writes data to or reads data from the VGA DRAM 40, the system bus 6 inputs system addresses SA(1) through SA(15) to respective second inputs of 16 3-1 multiplexers 100 and to a VGA address processor 98 of conventional design. The system bus 6 also inputs system addresses SA(16) through SA(19) to a decoder 96 which determines memory addresses AXXXX/BXXXX(bar). Finally, the system bus 6 throughputs system address SA(0).

When the 3-1 multiplexers 100 are set to select S0, for example, during an access to the BXXXX map, input address SA0-14 are shifted up two bits and the lowest two address bits are permanently set to zero. When the 3-1 multiplexers 100 are set to select 31, as during an access to the AXXXX map, input address SA1-15 are shifted up one bit, the lowest two address bits are permanently set to zero, and SA0 is used to select between D(0-7) and D(8-15) in the read/write data paths. The memory page select bit 17 originates from a control register within the CPU 4 and may be used to select one of two unique images in the 256K VGA DRAM 40 address space. When the 3-1 multiplexers 100 are set to select S2 or S3, the VGA-compatible addresses generated by the VGA address processor of conventional design are used.

Figure 4:
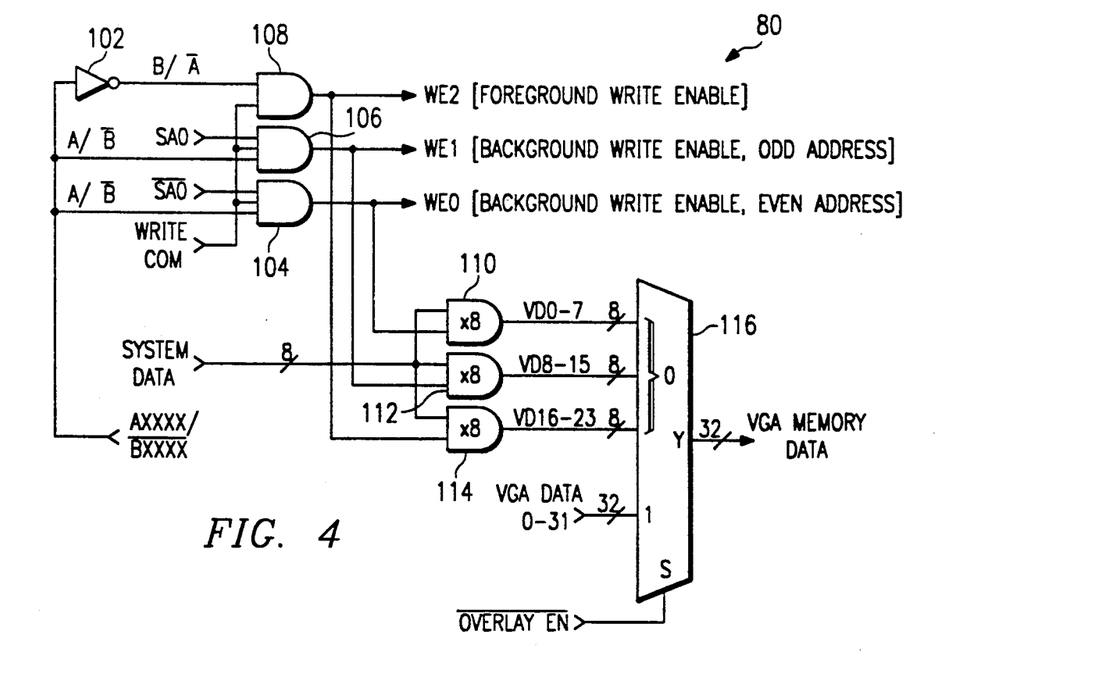
FIG. 4 is a block diagram of the data write steering logic of FIG. 2.

Referring next to FIG. 4, the VGA data write steering logic 80 for steering data output by the VGA graphics controller 78 into the four bit-planes for storage in the VGA DRAM 40 shall now be described in greater detail. In the non-overlay mode, VGA data is transmitted to the multiplexer 116 and, upon the OVERLAY EN(bar) signal going high, is transmitted to the memory controller 82. In the overlay mode, the overlay data addresses AXXXX/BXXXX(bar) (or A/B(bar)) output by the overlay address generator 77 are input first and second AND gates 104 and 106. The overlay data addresses A/B(bar) is also inverted by an inverter 102 and input to a third AND gate 108. The system address SA(0) throughput the overlay address generator 77 is provided as a second input to the second AND gate 106 and inverted system address SA(0)(bar) is provided as a second input to the first AND gate 106.

During a write operation, the CPU 4 drives WRITE COM high whenever a write operation to the AXXXX or BXXXX address space takes place. A write to the BXXXX address space sends WE=2 high. A write to an odd address in the AXXXX address space sends WE=1 high. Finally, a write to an even address in the AXXXX address space sends WE=0 high. Each write enable signal WE0, WE1, WE2 indicates to what location in the memory maps, an incoming data byte should be steered to. Specifically, if WE0 is active, an incoming data byte should be steered to an even address of the background. If WE1 is active, the incoming data bit should be steered to an odd address of the background and, if WE2 is active, the incoming data bit should be steered to the foreground address.

Write enable signals WE0, WE1 and WE2 are tied to an input of each of 8 AND gates 110, 112, 114. Each eight bit data byte input the VGA data write steering logic 80 is input to one of the eight AND gates 110, 112, 114 and the data byte is steered to an even address for the background (VD(0-7)) if WE0 is active, an odd address for the background (VD(8-15)) if WE1 is active and to the foreground if WE2 is active. The steered data is input, along with conventional VGA data, to a multiplexer 116 where the OVERLAY EN(bar) signal selects between a conventional VGA memory mapping and the steered data for input to the memory controller 82 and the VGA DRAM 40.

Figure 5:
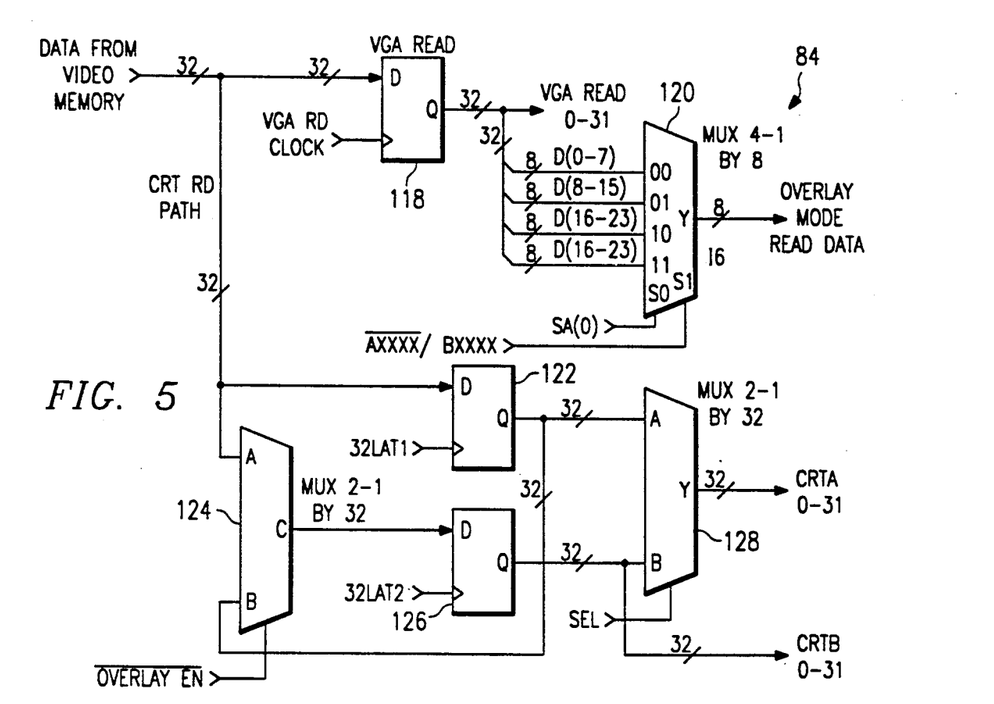
FIG. 5 is a block diagram of the data read steering logic of FIG. 2.

Referring next to FIG. 5, the VGA data read steering logic 84 for steering data shall now be described in greater detail. The VGA data read steering logic 84 is configured to selectively steer data read from the VGA DRAM 40 to one of three paths, depending on the type of read being performed. If data is being read to the CPU 4, data from the VGA DRAM 40 will be input a latch 118 where the data is designated as VGA data. The data output the latch 118 is also input to 8 4-1 multiplexers 120 where control signals SA(0) and A(bar)/B steers the data. If the control signals indicate an even address (SA(0) is low) for the AXXXX address space, the data is steered to D(0-7) in the AXXXX address space. If an odd address (SA(0) is high) for the AXXXX address space is indicated, the data is steered to D(8-15) in the AXXXX address space and if either an odd or even address for the BXXXX address space is indicated, the data is steered to D(16-23) in the BXXXX address space.

Finally, if the data is being read to the TV 44, the data is input to a latch 122 and 32 2-1 multiplexers 124. Control signal 32LAT1 transmitted by the overlay mode sequencer 88 latches the data at latch 122 to first inputs of 32 2-1 multiplexers 128 and second inputs to the 32 2-1 multiplexers 124. When the signal OVERLAY EN(bar) is low during the illustrated overlay mode, data is latched in parallel into latches 122 and 126. This allows the memory data accesses for the TV 44 to be staggered when transmitting first and second data words to the overlay mode memory map switching circuit 92. When OVERLAY EN(bar) is high, the latched pixel data is buffered through the latches 122, 126. The SEL signal for the 32 2-1 multiplexers 128 may be used for horizontal pixel panning in standard VGA mode but, in the overlay mode, the SEL signal is always low. As previously described, the memory data accesses in CRT mode are staggered as first and second consecutive 32-bit data words are transmitted to the switching circuit 92. The output of the multiplexer 128 is a first data word, CRTA and the output of the latch 126 is a second data word, CRTB.

Figure 6:
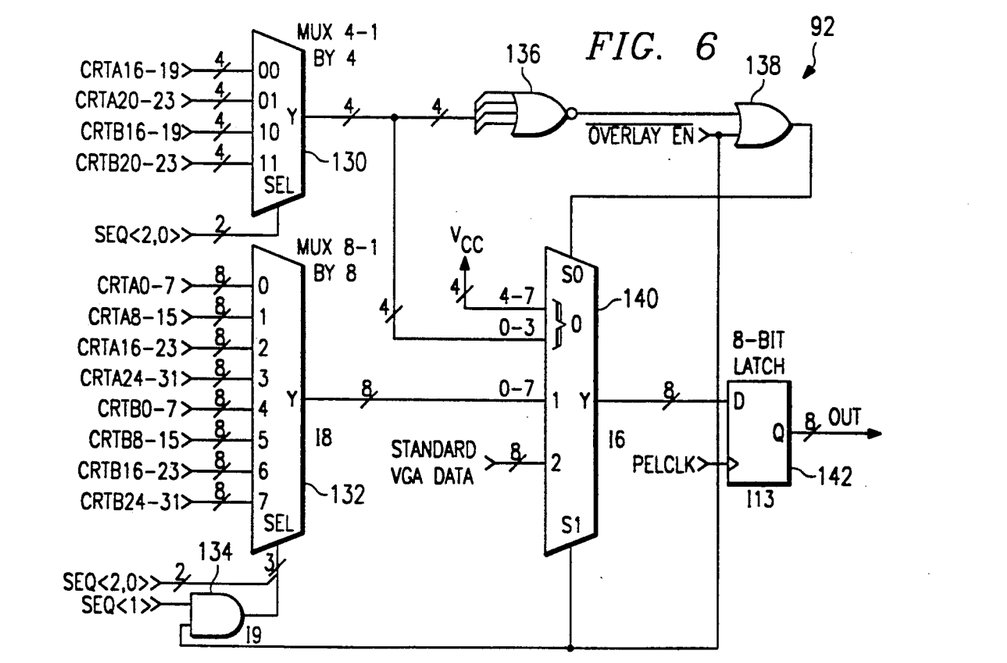
FIG. 6 is a block diagram of the overlay mode memory map switching circuit of FIG. 2.

Referring next to FIG. 6, the overlay mode memory map switching circuit 92 shall now be described in greater detail. When the VGA controller 32 is performing a CRT read while in overlay mode, CRTA and CRTB will each comprise two 8-bit background pixel elements at CRTA/CRTB 16-23. The data at CRTA/CRTB 24-31 are not used in this embodiment. CRTA, CRTB are they are output by the VGA data read steering logic 84 to the switching circuit 92 of the VGA attribute controller 90. The switching circuit 92 comprises four 4-1 multiplexers 130 and eight 8-1 multiplexers 132 which are controlled by the bus signals SEQ<2,0> and SEQ<1>0 generated by the VGA sequencer 86. As illustrated in FIG. 6, the high eight bits of CRTA, CRTB are input the four 4-1 multiplexers 130 while all 32 bits of CRTA, CRTB are input the eight 8-1 multiplexers. At a given time, the control signals SEQ <0,2>, <1> will cause the multiplexers 130 and 132 to output a 4-bit PEL from the foreground map and the corresponding 8-bit PEL from the background map. The 4-bit foreground pixel is transmitted to the lower four bits of the multiplexer 140 and is also transmitted to NOR gate 136 for comparison to zero. If it is zero, the output of NOR gate 136 will be high. In turn, the output of NOR gate 136 is input to OR gate 138, the second input of which is connected to the active low OVERLAY EN(bar) signal. The output of OR gate 138 controls 3-1 multiplexer 140, which, in addition to having the 4-bit foreground pixel in the lower 4 bits has the next upper 4 bits tied to logic 1 (Vcc). Therefore, the top 15 palette addresses F1-FF are shared between the foreground and the background. In turn, the multiplexer 140 will select between inputs 0 and 1 if overlay mode is enabled. In overlay mode, the multiplexer 140 will select from the outputs of the multiplexers 132 (the background data) if the output of the multiplexers 130 is zero (which indicates that the foreground data is zero), and will select from the output of the multiplexers 130 if the data at the multiplexers 130 does not equal zero (which indicates the presence of foreground data). In non-overlay mode, the multiplexers 140 will select from a parallel VGA data path.

Figure 7:
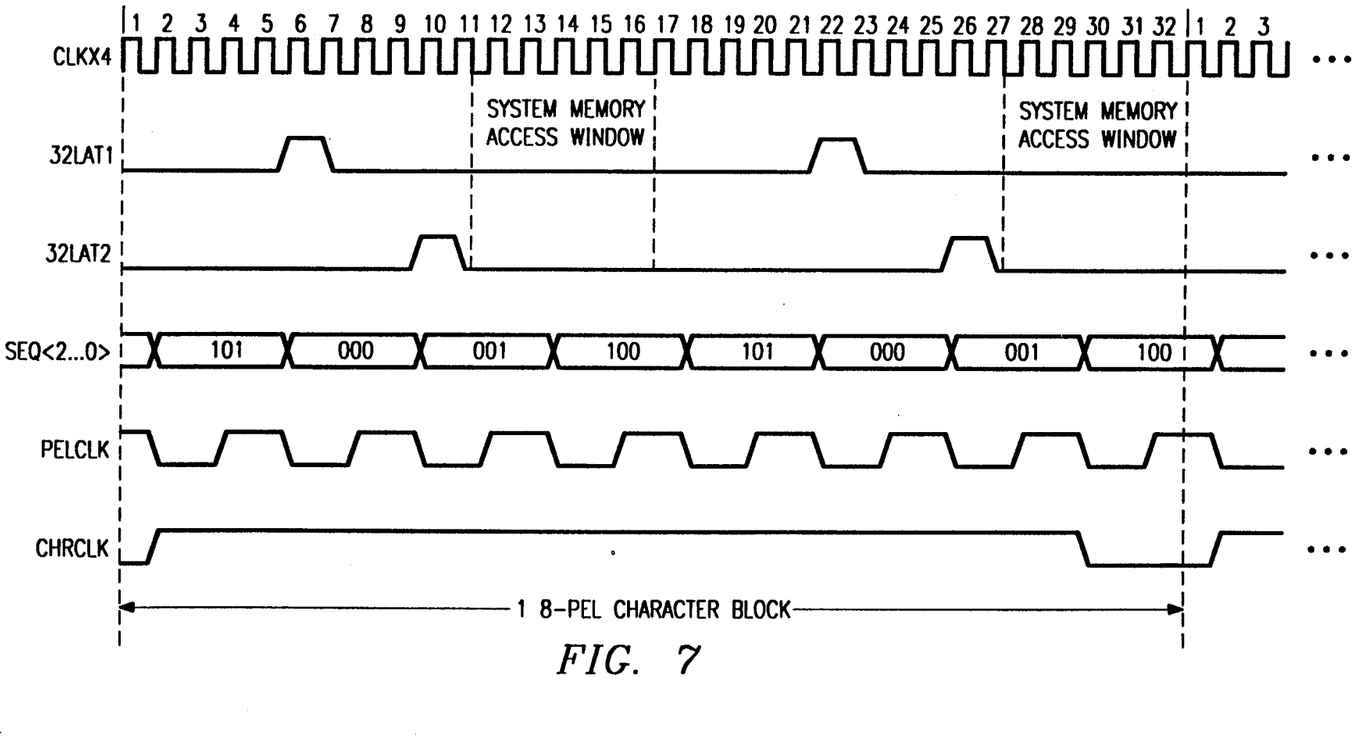
FIG. 7 is a timing diagram for the sequencing outputs generated by the VGA sequencer of FIG. 2.

Referring next to FIG. 7, the overlay mode control signals generated by the VGA sequencer 86 shall now be described in greater detail. Here, a clock circuit 73 (visible in FIG. 2) generates the CLKX4 signal from which the pixel clock (or "PELCLK") and character clock (or "CHRCLK") signals are derived. The CHRCLK signal is ⅛ the frequency of the PELCLK signal. When 32LAT1 and 32LAT2 pulse, 32-bit words from the memory controller 82 are latched by the VGA data read steering logic 84 on the falling edge of 32LAT1 and 32LAT2. The CRT controller 74 controls the address generated for the 4 32-bit words latched during each 8 PEL character block.

Also shown are system memory access windows during which the CPU 4 may perform reads or writes to the VGA DRAM 40. Arbitration circuitry (not shown) within the memory controller 82 will force the CPU 4 to wait when necessary, or will buffer memory cycles so that they fit into the time window allotted. The signal labelled SEQ <2,0>, SEQ <1> drives the multiplexers 130, 132 to select the foreground data, or in the absence thereof, the background data for output to the palette 37.

Thus, there has been described and illustrated herein a VGA controller having an overlay mode for displaying images formed from selective components of multiple image planes related to foreground and background data for the image. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation of the scope of the invention.

What is claimed is:

1. A multimedia system operable in an overlay mode to display images formed from selective components of multiple image planes, comprising:

a system bus;

a central processing unit (CPU) connected to said system bus, said CPU generating a first image signal having one eight bit background pixel element encoded in each data byte thereof, a second image signal having two four bit foreground pixel elements encoded in each data byte thereof which overlays said first image signal, and a series of system addresses corresponding to first and second address maps for said first and second image signals;

a random access memory having first, second, third and fourth bit planes and connected to said system bus; and a VGA controller connected to said system bus and receiving said first and second image signals and said system addresses from said CPU, said VGA controller comprising:

first means for routing a first data set comprised of a first series of data bytes corresponding to said first image signal and a second data set comprised of a second series of data bytes corresponding to said second image signal to said random access memory for storage therein comprising steering logic for sequentially routing each byte of said first and second series of data bytes input thereto to one of three of said four bit planes based upon whether said data byte is an even eight bit pixel data element, an odd eight bit pixel element, or two four bit pixel elements, said routing means interleaving said first and second data sets and storing said interleaved first and second data sets on said three of said four bit planes of said random access memory;

a switching circuit; and second means for routing said interleaved first and second data sets to said switching circuit, said switching circuit separating said first and second data sets and selectively transmitting said first and second data sets for display based upon a characteristic of said second data set.

2. A multimedia system according to claim 1 wherein said steering logic further comprises:

means for generating first, second and third write enable signals from said CPU generated system addresses, each said write enable signal corresponding to one of said three of said four bit planes of said random access memory; and eight AND gate circuits, each having first, second and third AND gates, each AND gate having a first input connected to receive a bit of said data byte sequentially input to said first routing means, a second input connected to receive said first, second and third write enable signals, respectively, and an output connected to said random access memory;

wherein one of said first, second and third AND gates for each of said eight AND gate circuits is enabled by one of said write enable signals to output said bit input thereto to said random access memory for storage on said bit plane corresponding to said enabling write enable signal.

3. A multimedia system according to claim 2 and further comprising multiplexer means connected to receive said data bits output by said AND gate circuits and VGA data from said CPU, said multiplexer means selectively storing said data bits output by said AND gate circuits on said three of said four bit planes within said random access memory when said multimedia system is operating in said overlay mode and storing said VGA data on four of said four bit planes within said random access memory when said multimedia system is not operating in said overlay mode.

4. A multimedia system according to claim 1 wherein said second routing means comprises a memory controller connected to said random access memory for 32 bit words from said random access memory, each said word containing two pixel elements from said first series of data bytes and two pixel elements from said second series of data bytes.

5. A multimedia system according to claim 4 wherein said switching circuit further comprises:

a first multiplexer circuit having four multiplexers, each said multiplexer of said first multiplexer circuit having four inputs connected to said second routing means and an output, each said input of said first multiplexer circuit receiving one bit of each of said two four bit pixel elements in a first one of said 32-bit words and each bit of each of said two four bit pixel elements in a second one of said 32 bit words; and a second multiplexer circuit having eight multiplexers, each said multiplexer in said second multiplexer circuit having eight inputs connected to said second routing means and an output, each said input of said second multiplexer circuit receiving one bit of each of said first and second 32-bit words.

6. A multimedia system according to claim 5 and further comprising a VGA sequencer having an output connected to said multiplexers of said first and second multiplexer circuits, said VGA sequencer generating sequencing signals which control said multiplexers such that said first and second multiplexer circuits simultaneously output a four bit pixel element of said first image signal and a corresponding eight bit pixel element of said second image signal, respectively.

7. A multimedia system according to claim 6 wherein said switching circuit further comprises means for selecting the output of said first multiplexer circuit for display if said output of said first multiplexer circuit has a value other than zero and selecting the output of said second multiplexer circuit for display if said output of said first multiplexer circuit has a value of zero.

8. A multimedia system according to claim 7 wherein said selecting means further comprises:

a determining circuit for determining if said output of said first multiplexer circuit has a value of zero;

a third multiplexer having four inputs connected to the outputs of said multiplexers of said first multiplexer circuit, eight inputs connected to the outputs of said multiplexers of said second multiplexer circuit, an input connected to receive a signal from said determining means and eight output means, said third multiplexer selecting which of said multiplexer circuit inputs to propagate via said output means based upon said input from said determining circuit.

9. A multimedia system according to claim 8 wherein said third multiplexer further comprises eight inputs connected to said random access memory, said third multiplexer selecting one of said multiplexer inputs for propagation via said output means when said multimedia system is operating in said overlay mode and selecting said random access memory input for propagation via said output means when said multimedia system is not operating in said overlay mode.

10. A multimedia system according to claim 1 wherein said random access memory is a dynamic random access memory.

11. A multimedia system operable in an overlay mode in which images formed from selective components of a 15 color foreground image and a 256 color background image are displayed, comprising:

a system bus;

a central processing unit (CPU) connected to said system bus, said CPU generating a foreground image signal having two four bit foreground pixel elements encoded in each data byte thereof, a background image signal having one eight bit background pixel element encoded in each byte thereof and a series of system addresses corresponding to first and second address maps for said foreground and background image signals;

a random access memory having first, second, third and fourth bit planes and connected to said system bus and;

a VGA controller connected to said system bus and receiving said foreground and background image signals and said system addresses from said CPU, said VGA controller comprising:

first means for routing said foreground and background image signals to said random access memory for storage therein, said first routing means interleaving said foreground and background image signals and storing said interleaved foreground and background image signals on three of said four bit planes of said random access memory, said first routing means comprising steering logic which sequentially routes each byte of said foreground and background image signals to one of said three of said four bit planes based upon whether said byte is an even eight bit background pixel element, an odd eight bit background pixel element, or two four bit foreground pixel elements;

a switching circuit; and a memory controller for routing said interleaved foreground and background signals stored in said random access memory to said switching circuit, said memory controller fetching 32 bit words from said random access memory, each said word containing two four bit foreground pixel elements and two eight bit background pixel elements, said switching circuit separating said foreground and background signals and selectively transmitting said one of said signals for display based upon a characteristic of said foreground signal.

12. A multimedia system according to claim 11 wherein said steering logic further comprises:

means for generating first, second and third write enable signals from said CPU generated system addresses, each said write enable signal corresponding to one of said bit planes of said random access memory; and eight AND gate circuits, each having first, second and third AND gates, each AND gate having a first input connected to receive a bit of said byte sequentially input to said routing means, a second input connected to receive said first, second and third write enable signals, respectively, and an output connected to said random access memory;

wherein one of said first, second and third AND gates for each of said eight AND gate circuits are enabled by one of said write enable signals to output said bit input thereto to said random access memory for storage on said bit plane corresponding to said enabling write enable signal.

13. A multimedia system according to claim 12 wherein said switching circuit further comprises:

a first multiplexer circuit having four multiplexers, each said multiplexer of said first multiplexer circuit having four inputs connected to said second routing means and an output, each said input of said first multiplexer circuit receiving one bit of each of said two four bit pixel element in a first one of said 32-bit words and one bit of each of said two four bit pixel elements in a second one of said 32 bit words; and a second multiplexer circuit having eight multiplexers, each said multiplexer in said second multiplexer circuit having eight inputs connected to said second routing means and an output, each said input of said second multiplexer circuit receiving one bit of each of said first and second 32-bit words.

sequencing means having an output connected to said multiplexers of said first and second multiplexer circuits, said sequencing means generating sequencing signals which control said multiplexers such that said first and second multiplexer circuits simultaneously output a four bit foreground pixel element and an eight bit background element of said first and second image signals, respectively;

a determining circuit for determining if said output of said four bit foreground pixel element is one of said fifteen colors or is transparent; and a third multiplexer having four inputs connected to the outputs of said multiplexers of said first multiplexer circuit, eight inputs connected to the outputs of said multiplexers of said second multiplexer circuit, an input connected to receive a signal from said determining means and output means, said third multiplexer propagating said four bit foreground pixel element via said output means if said four bit foreground pixel element is one of said fifteen colors and propagating said eight bit background pixel element via said output means if said four bit background pixel element is transparent.

14. A multimedia system according to claim 13 and further comprising multiplexer means connected to receive said data bits output by said AND gate circuits and VGA data from said CPU, said multiplexer means selectively mapping said data bits output by said AND gate circuits into said three bit planes within said random access memory when said multimedia system is operating in said overlay mode and mapping said VGA data into a four plane VGA mapping within said random access memory when said multimedia system is not operating in said overlay mode.

15. A multimedia system according to claim 14 wherein said third multiplexer further comprises eight inputs connected to said random access memory, said third multiplexer selecting either said four bit foreground pixel element or said eight bit background pixel element for propagation via said output means when said multimedia system is operating in said overlay mode and selecting said random access memory input for propagation via said output means when said multimedia system is not operating in said overlay mode.

16. A multimedia system according to claim 11 wherein said random access memory is a dynamic random access memory.

* * * * *

UNITED STATES PATENT AND TRADEMARK OFFICE
CERTIFICATE OF CORRECTION

PATENT NO. : 5,254,984

DATED : October 19, 1993

INVENTOR(S) : Carl W. Wakeland

It is certified that error appears in the above-identified patent and that said Letters Patent is hereby corrected as shown below:

Column 2, Line 47, "FIG." should be ---FIG. 1---.

Column 4, Line 3, "into the VGA DRAM 40 utilizing" should be ---and store the interleaved data in the VGA DRAM on---.

Column 7, Line 64, "31" should be ---S1---.

Column 9, Line 32, "CRTA/CRTB 16-23" should be ---CRTA/CRTB 0-15 and two 4-bit foreground pixel elements at CRTA/CRTB 16-23---.

Signed and Sealed this

Ninth Day of August, 1994

Attest:

Attesting Officer

BRUCE LEHMAN

Commissioner of Patents and Trademarks